United States Patent
Izumiura et al.

(10) Patent No.: US 7,429,128 B2
(45) Date of Patent: Sep. 30, 2008

(54) FAILURE DETERMINATION SYSTEM AND METHOD FOR TEMPERATURE SENSORS, AS WELL AS ENGINE CONTROL UNIT

(75) Inventors: Atsushi Izumiura, Saitama-ken (JP); Daisuke Sato, Saitama-ken (JP); Eisaku Gosyo, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 11/497,265

(22) Filed: Aug. 2, 2006

(65) Prior Publication Data
US 2007/0047616 A1 Mar. 1, 2007

(30) Foreign Application Priority Data
Aug. 25, 2005 (JP) ............... 2005-245064

(51) Int. Cl.
G01K 15/00 (2006.01)
G01K 13/00 (2006.01)
G01K 19/00 (2006.01)
G01C 25/00 (2006.01)
G01D 18/00 (2006.01)

(52) U.S. Cl. .............. 374/144; 374/1; 702/99; 702/104; 701/34

(58) Field of Classification Search ........ 374/1, 374/144; 701/34; 702/99, 104
See application file for complete search history.

(56) References Cited

U.S. PATENT DOCUMENTS

| | | | |
|---|---|---|---|
| 6,684,154 B2 * | 1/2004 | Isobe et al. ............ | 701/114 |
| 7,147,366 B2 * | 12/2006 | Melby et al. ............ | 374/1 |
| 7,275,425 B2 * | 10/2007 | Buck et al. ............. | 73/114.61 |
| 2005/0102076 A1 * | 5/2005 | Kariya et al. ........... | 701/34 |
| 2006/0052931 A1 * | 3/2006 | Shikama et al. .......... | 701/114 |
| 2007/0045112 A1 * | 3/2007 | Tashiro ................. | 204/401 |

FOREIGN PATENT DOCUMENTS

JP 2006-057455 3/2006

OTHER PUBLICATIONS

Japanese Office Action, issued on Jan. 29, 2008, for corresponding Japanese Application No. 2005-245064.

* cited by examiner

*Primary Examiner*—Gail Verbitsky
*Assistant Examiner*—Mirellys Jagan
(74) *Attorney, Agent, or Firm*—Arent Fox LLP.

(57) ABSTRACT

A failure determination system for determining failures of temperature sensors, which is capable of easily and accurately determining failures of the sensors in actual operating temperature ranges thereof, even when the ranges are different from each other. Temperatures detected by exhaust gas temperature sensors are stored as initial temperatures when the engine has stopped. Temperatures detected by the respective sensors after stoppage of the engine are made dimensionless based on the corresponding initial temperatures to thereby calculate dimensionless values. An estimated dimensionless value of a temperature to be detected when each sensor is normal is set in advance as an estimated normal value. Failures of the sensors are determined based on results of comparisons of the dimensionless values with the estimated normal value.

6 Claims, 7 Drawing Sheets

F I G. 1
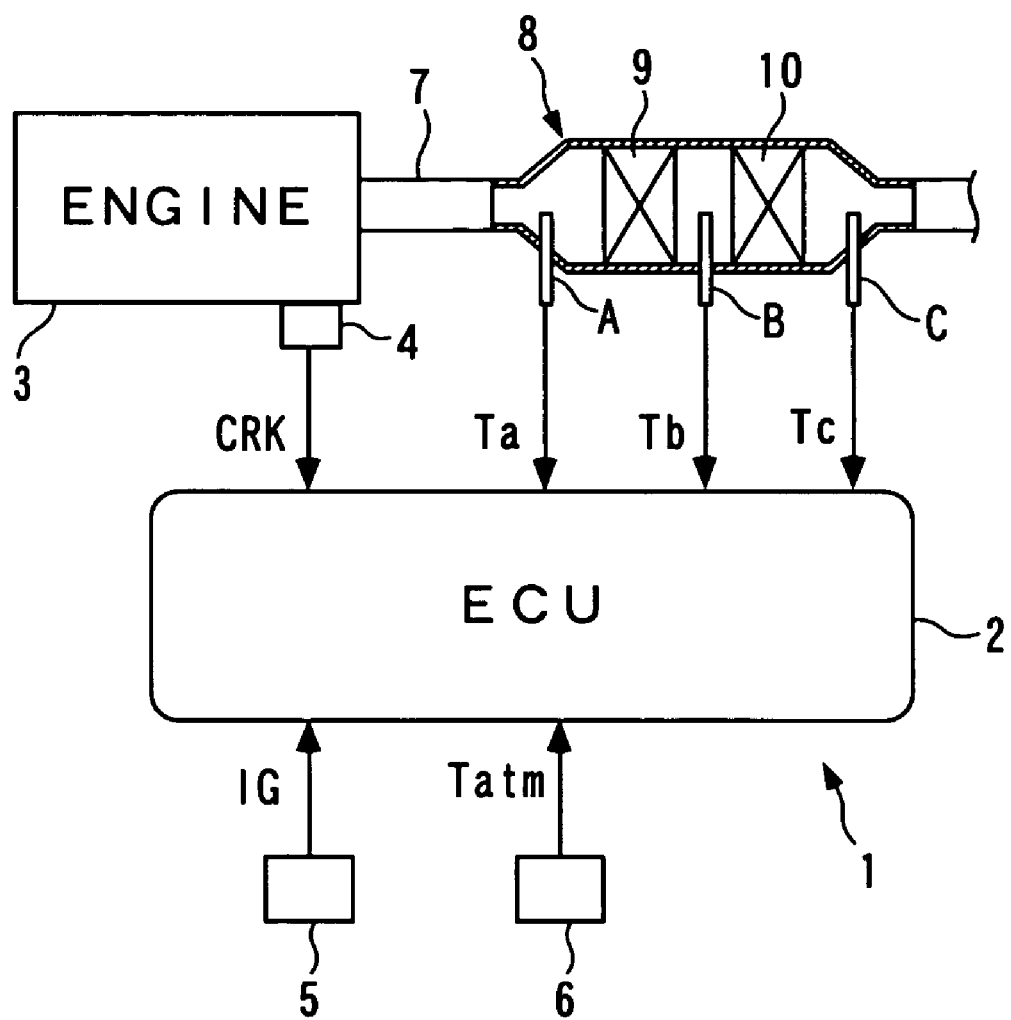

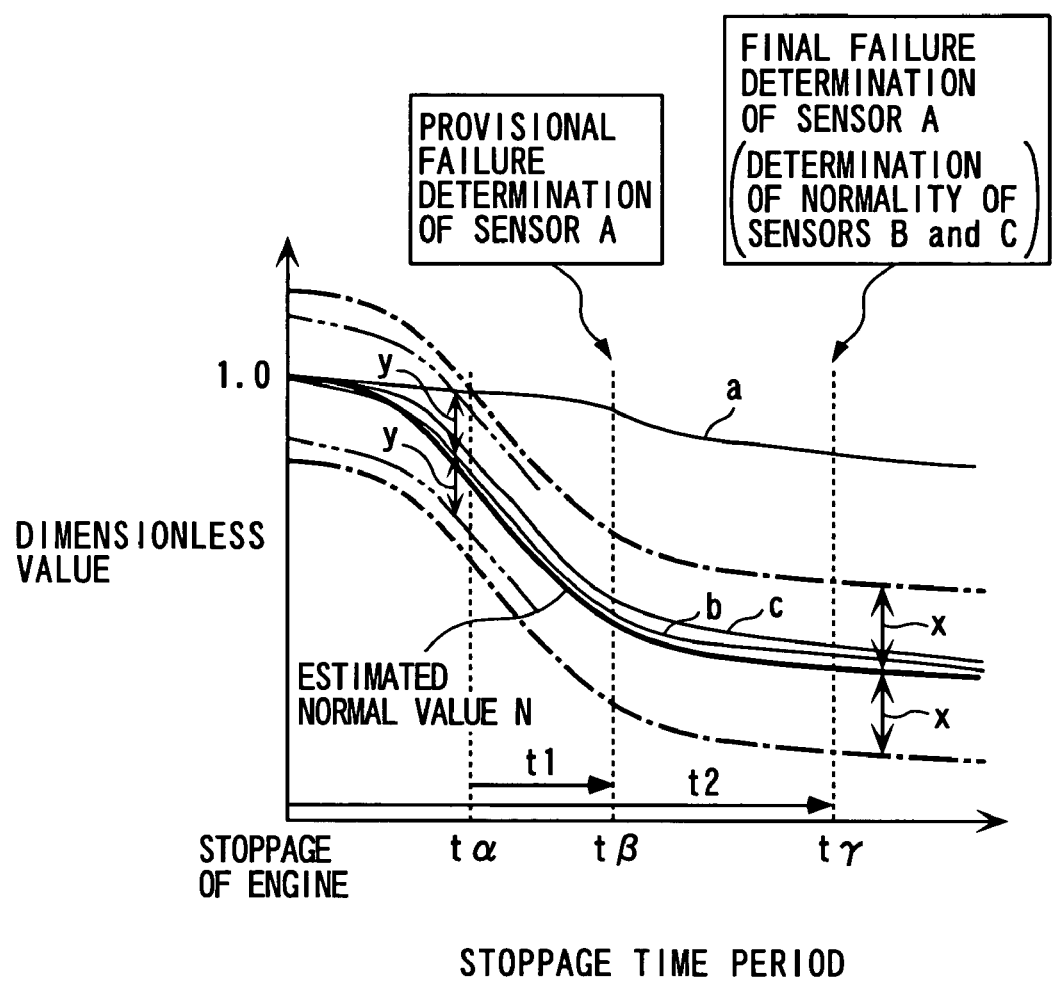
F I G. 8

FAILURE DETERMINATION SYSTEM AND METHOD FOR TEMPERATURE SENSORS, AS WELL AS ENGINE CONTROL UNIT

BACKGROUND OF THE INVENTION

1. Field of the Invention

This invention relates to a failure determination system and method for a plurality of temperature sensors provided in an internal combustion engine, and an engine control unit.

2. Description of the Related Art

Conventionally, this kind of failure determination system for temperature sensors has been proposed in Japanese Utility Model Publication (Kokoku) No. H05-24033. The failure determination system is provided for determining failures of an intake air temperature sensor for detecting the intake air temperature of the engine, and an engine coolant temperature sensor for detecting the coolant temperature of the engine. More specifically, first, detection values of the intake air temperature and the engine coolant temperature detected by the intake air temperature sensor and the engine coolant temperature sensor, respectively, are sampled at predetermined time intervals for a predetermined time period after stoppage of the engine. Then, final convergence values of the detection values of temperatures detected by the respective temperature sensors are calculated (estimated) using the sampled detection values, by predetermined approximate expressions. When the difference between the convergence values is not larger than a predetermined value, it is determined that both of the temperature sensors are normal, whereas when the difference between the convergence values is larger than the predetermined value, it is determined that at least one of the temperature sensors is faulty. The above determination method utilizes the fact that when the temperature sensors are both normal, the detection values of temperatures detected by the respective temperature sensors converge to ambient temperature, such as outside air temperature, and finally become approximately equal to each other.

As described above, in the failure determination system, the final convergence values of the detection values are estimated based on the detection values of temperatures detected by the respective temperature sensors. Therefore, the accuracy of the estimated convergence values is not necessarily high, which sometimes prevents accurate failure determination of the temperature sensors. Of course, it is possible to enhance the accuracy of the convergence values by sampling the detection values detected by the temperature sensors for a longer time period. In this case, however, it takes a long time to determine failures of the temperature sensors.

Further, some temperature sensors are used in actual operating temperature ranges largely different from ambient temperature. In such a case, even if convergence values obtained from the respective temperature sensors are compared with each other, it is impossible to carry out proper failure determination of the temperature sensors in actual operating temperature ranges thereof. For example, in general, exhaust gas temperature sensors for detecting the temperature of exhaust gases are not configured to be capable of ensuring sufficiently high detection accuracy in a normal temperature range, including outside air temperature, since they are used in a very high temperature range of which values are 300 to 400° C. even immediately after stoppage of the engine. Therefore, it is impossible to properly determine failures of the two temperature sensors in the operating temperature range by comparison between the convergence values which are obtained from the respective temperature sensors but are largely different from the operating temperature range.

SUMMARY OF THE INVENTION

The present invention has been made to provide a solution to the above-described problems, and an object thereof is to provide a failure determination system and method for a plurality of temperature sensors and an engine control unit which are capable of easily and accurately determining failures of the temperature sensors in actual operating temperature ranges thereof, even when the actual operating temperature ranges are different from each other.

To attain the above object, in a first aspect of the present invention, there is provided a failure determination system for determining failures of a plurality of temperature sensors provided in an internal combustion engine, comprising stoppage detecting means for detecting whether or not the engine has stopped, initial temperature-storing means for storing respective temperatures detected by the temperature sensors when stoppage of the engine is detected, as initial temperatures; dimensionless value-calculating means for making dimensionless the respective temperatures detected by the temperature sensors after stoppage of the engine based on the corresponding initial temperatures, to thereby calculate respective dimensionless values of the temperatures detected by the temperature sensors, estimated normal value-setting means for setting in advance an estimated value of a dimensionless value of a temperature to be detected when the temperature sensors are normal, as an estimated normal value, and failure determination means for determining failures of the temperature sensors based on results of comparisons of the respective calculated dimensionless values of the temperatures detected by the temperature sensors with the set estimated normal value.

With the configuration of this failure determination system, when the stoppage detecting means detects stoppage of the engine, the initial temperature-storing means stores the respective temperatures detected by the temperature sensors as initial temperatures. Further, the dimensionless value-calculating means makes dimensionless the respective temperatures detected by the temperature sensors after the stoppage of the engine based on the corresponding initial temperatures, to thereby calculate dimensionless values of the temperatures detected by the temperature sensors. Further, the estimated normal value-setting means sets in advance an estimated value of a dimensionless value of a temperature to be detected when each of the temperature sensors is normal, as an estimated normal value. Then, the failure determination means determines failures of the temperature sensors based on results of comparisons of the respective dimensionless values of the temperatures detected by the temperature sensors with the estimated normal value.

When the engine has stopped, all the actual temperatures at different locations of the engine detected by the temperature sensors change such that they progressively decrease toward ambient temperature, such as outside air temperature. Further, the actual temperatures detected upon stoppage of the engine can be different from each other depending on the locations where the temperature sensors are disposed and operating conditions of the engine before the stoppage. In this case, manners of changes in the actual temperatures after the stoppage are also different from each other. According to the present invention, as described above, the dimensionless values of the respective temperature sensors are calculated by making dimensionless the respective temperatures detected by the temperature sensors after stoppage of the engine based on the corresponding initial temperatures, and therefore if the temperature sensors are normal, the dimensionless values of the temperature sensors, thus obtained, change with an approximately similar decreasing tendency to each other after stoppage of the engine, even if the actual temperatures detected upon stoppage of the engine are different from each other. Accordingly, by comparing the dimensionless values obtained from the temperature sensors with the estimated normal value set in advance, it is possible to accurately determine failures of the temperature sensors in the actual operating temperature ranges thereof.

Further, as described above, since the dimensionless values of the temperature sensors change with an approximately similar decreasing tendency to each other, it is only required to prepare one estimated normal value indicative of changes of the dimensionless values to be obtained from the temperature sensors when they are normal. Assuming that the temperatures detected by the temperature sensors are directly compared with the normal estimated temperature to be detected when the temperature sensors are normal without making the detected temperatures dimensionless as described above, it is necessary to prepare a map of a large number of normal estimated temperature values depending on the differences between the actual temperatures detected upon stoppage of the engine. In view of this, with the configuration of the present embodiment, it is only required to prepare one estimated normal value indicative of changes in the dimensionless values of the normal temperature sensors, as described above, and hence it is possible to easily determine failures of the temperature sensors according to a single criterion, even when their actual operating temperature ranges are different from each other.

To attain the above object, in a second aspect of the present invention, there is provided a failure determination system for determining failures of a plurality of temperature sensors provided in an internal combustion engine, comprising stoppage detecting means for detecting whether or not the engine has stopped, initial temperature-storing means for storing respective temperatures detected by the temperature sensors when stoppage of the engine is detected, as initial temperatures; dimensionless value-calculating means for making dimensionless the respective temperatures detected by the temperature sensors after stoppage of the engine based on the corresponding initial temperatures, to thereby calculate respective dimensionless values of the temperatures detected by the temperature sensors, and failure determination means for determining failures of the temperature sensors based on results of comparisons between the calculated dimensionless values of the temperatures detected by the temperature sensors.

With the configuration of this failure determination system, temperatures detected by the temperature sensors when stoppage of the engine is detected are stored as initial temperatures, respectively. Further, the temperatures detected by the temperature sensors after stoppage of the engine are made dimensionless based on the corresponding initial temperatures, to thereby calculate respective dimensionless values of the temperatures detected by the temperature sensors. Then, failures of the temperature sensors are determined based on results of comparisons between the dimensionless values. As described above, the dimensionless values of the temperature sensors change with an approximately similar decreasing tendency to each other after stoppage of the engine, if the temperature sensors are normal, so that by comparing the dimensionless values with each other, it is possible to accurately determine failures of the temperature sensors in actual operating temperature ranges thereof, and easily perform failure determination on even a plurality of temperature sensors different in operating temperature ranges thereof.

To attain the above object, in a third aspect of the present invention, there is provided a method of determining failures of a plurality of temperature sensors provided in an internal combustion engine, comprising a stoppage detecting step of detecting whether or not the engine has stopped, an initial temperature-storing step of storing respective temperatures detected by the temperature sensors when stoppage of the engine is detected, as initial temperatures, a dimensionless value-calculating step of making dimensionless the respective temperatures detected by the temperature sensors after stoppage of the engine based on the corresponding initial temperatures, to thereby calculate respective dimensionless values of the temperatures detected by the temperature sensors, an estimated normal value-setting step of setting in advance an estimated value of a dimensionless value of a temperature to be detected when the temperature sensors are normal, as an estimated normal value, and a failure determination step of determining failures of the temperature sensors based on results of comparisons of the respective calculated dimensionless values of the temperatures detected by the temperature sensors with the set estimated normal value.

With the configuration of this failure determination method, it is possible to obtain the same advantageous effects as provided by the failure determination system according to the first aspect of the present invention.

To attain the above object, in a fourth aspect of the present invention, there is provided a method of determining failures of a plurality of temperature sensors provided in an internal combustion engine, comprising a stoppage detecting step of detecting whether or not the engine has stopped, an initial temperature-storing step of storing respective temperatures detected by the temperature sensors when stoppage of the engine is detected, as initial temperatures, a dimensionless value-calculating step of making dimensionless the respective temperatures detected by the temperature sensors after stoppage of the engine based on the corresponding initial temperatures, to thereby calculate respective dimensionless values of the temperatures detected by the temperature sensors, and a failure determination step of determining failures of the temperature sensors based on results of comparisons between the calculated dimensionless values of the temperatures detected by the temperature sensors.

With the configuration of this failure determination method, it is possible to obtain the same advantageous effects as provided by the failure determination system according to the second aspect of the present invention.

To attain the above object, in a fifth aspect of the present invention, there is provided an engine control unit including a control program for causing a computer to determine failures of a plurality of temperature sensors provided in an internal combustion engine, wherein the control program causes the computer to detect whether or not the engine has stopped, store respective temperatures detected by the temperature sensors when stoppage of the engine is detected, as initial temperatures, make dimensionless the respective temperatures detected by the temperature sensors after stoppage of the engine based on the corresponding initial temperatures, to thereby calculate respective dimensionless values of the temperatures detected by the temperature sensors, set in advance an estimated value of a dimensionless value of a temperature to be detected when the temperature sensors are normal, as an estimated normal value, and determine failures of the temperature sensors based on results of comparisons of the respective calculated dimensionless values of the temperatures detected by the temperature sensors with the set estimated normal value.

With the configuration of this engine control unit, it is possible to obtain the same advantageous effects as provided by the failure determination system according to the first aspect of the present invention.

To attain the above object, in a sixth aspect of the present invention, there is provided an engine control unit including a control program for causing a computer to determine failures of a plurality of temperature sensors provided in an internal combustion engine, wherein the control program causes the computer to detect whether or not the engine has stopped, store respective temperatures detected by the temperature sensors when stoppage of the engine is detected, as initial temperatures, make dimensionless the respective temperatures detected by the temperature sensors after stoppage of the engine based on the corresponding initial temperatures, to thereby calculate respective dimensionless values of the temperatures detected by the temperature sensors, and determine failures of the temperature sensors based on results of comparisons between the calculated dimensionless values of the temperatures detected by the temperature sensors.

With the configuration of this engine control unit, it is possible to obtain the same advantageous effects as provided by the failure determination system according to the second aspect of the present invention.

The above and other objects, features, and advantages of the present invention will become more apparent from the following detailed description taken in conjunction with the accompanying drawings.

BRIEF DESCRIPTION OF THE DRAWINGS

FIG. 1 is a schematic diagram of a failure determination system for temperature sensors, according to an embodiment of the present invention, and an internal combustion engine to which the failure determination system is applied;

FIG. 8 is a diagram showing examples of changes in dimensionless values obtained from the three exhaust gas temperature sensors.

DETAILED DESCRIPTION OF PREFERRED EMBODIMENTS

Figure 2:
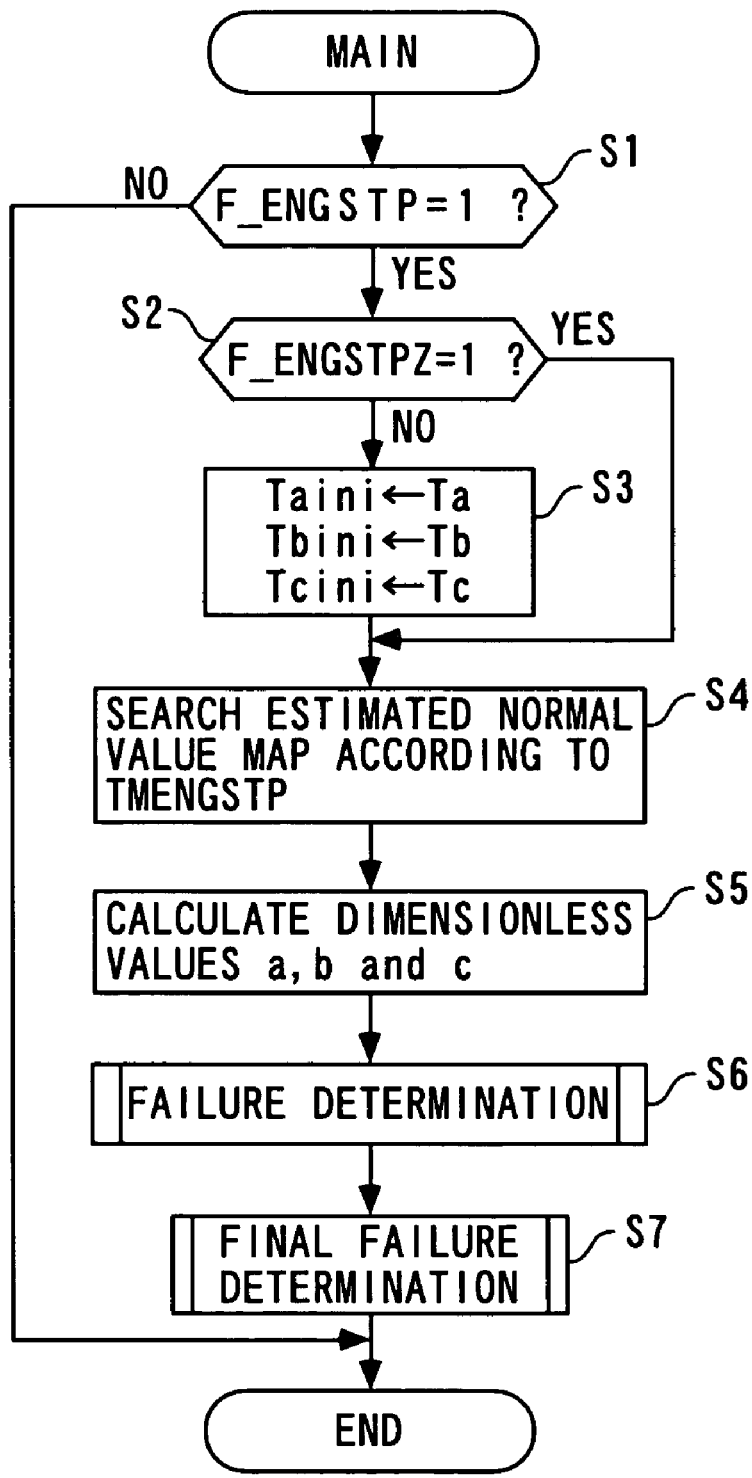
FIG. 2 is a flowchart showing a main flow of a failure determination process for determining failures of exhaust gas temperature sensors.

The present invention will now be described in detail with reference to the drawings showing preferred embodiments thereof. Referring first to FIG. 1, there is schematically shown the arrangement of a failure determination system for a plurality of temperature sensors, according to an embodiment of the present invention, and an internal combustion engine to which the failure determination system is applied. As shown in FIG. 1, the failure determination system 1 includes an ECU 2, and determines failures of three exhaust gas temperature sensors A, B, and C (temperature sensors) that detect temperatures of exhaust gases emitted from the internal combustion engine (hereinafter simply referred to as "the engine") 3.

The engine 3 is a diesel engine having e.g. four cylinders, with a crank angle sensor 4 mounted in its body. The crank angle sensor 4 is implemented by a combination e.g. of a magnet rotor and an MRE pickup, and delivers a CRK signal, for example, which is a pulse signal, to the ECU 2 along with rotation of a crankshaft, not shown, of the engine 3, whenever the crankshaft rotates through a predetermined crank angle. The ECU 2 calculates the rotational speed NE of the engine 3 (hereinafter referred to as "the engine speed NE") based on the CRK signal. Further, the ECU 2 receives an IG signal indicative of an ON/OFF state of an ignition switch 5 from the same, and a signal indicative of an outside air temperature Tatm from an outside air temperature sensor 6.

Further, an exhaust emission control device 8 is inserted into an exhaust pipe 7 of the engine 3. At respective upstream and downstream locations inside the exhaust emission control device 8, there are provided an oxidation catalyst 9 and a DPF (Diesel Particulate Filter) 10 in a manner spaced from each other. Further, the three exhaust gas temperature sensors A, B, and C, each of which is implemented e.g. by a thermistor, are mounted in the exhaust emission control device 8 at respective locations of the exhaust emission control device 8 from upstream to downstream in the mentioned order. The exhaust gas temperature sensor A detects the temperature Ta of exhaust gases upstream of the oxidation catalyst 9, and delivers a signal indicative of the sensed temperature Ta to the ECU 2. The exhaust gas temperature sensor B detects the temperature Tb of exhaust gases between the oxidation catalyst 9 and the DPF 10, and delivers a signal indicative of the sensed temperature Tb to the ECU 2. The exhaust gas temperature sensor C detects the temperature Tc of exhaust gases downstream of the DPF 10, and delivers a signal indicative of the sensed temperature Tc to the ECU 2.

The ECU 2 is implemented by a microcomputer including an I/O interface, a CPU, a RAM, and a ROM, none of which are specifically shown. The RAM includes a backup RAM for maintaining data stored therein by a backup power supply even after stoppage of the engine 3. The detection signals from the aforementioned sensors are input to the CPU after the I/O interface performs A/D conversion and waveform shaping thereon. The CPU determines failures of the three exhaust gas temperature sensors, A, B, and C, based on the above-mentioned input detection signals, in accordance with control programs read from the ROM. Further, in the present embodiment, the ECU 2 implements stoppage detecting means, initial temperature-storing means, dimensionless value-calculating means, estimated normal value-setting means, and failure determination means.

FIG. 2 is a flowchart showing a main flow of a failure determination process for determining failures of the exhaust gas temperature sensors A, B, and C. The present process is carried out at predetermined time intervals (e.g. of 200 ms) even after stoppage of the engine 3. In the present process, first, in a step 1 (shown as Si in abbreviated form in FIG. 2; the following steps are also shown in abbreviated form), it is determined whether or not an engine stop flag F_ENGSTP is equal to 1. The engine stop flag F_ENGSTP is set to 1 when the engine 3 has stopped, that is, when the ignition switch 5 is in the OFF state and at the same time the engine speed NE is equal to 0. If the answer to the question of the step 1 is negative (NO), i.e. if the engine 3 is in operation, the present process is immediately terminated.

On the other hand, if the answer to the question of the step 1 is affirmative (YES), the process proceeds to a step 2, wherein it is determined whether or not the immediately preceding value F_ENGSTPZ of the engine stop flag is equal to 1. If the answer to the question of the step 2 is negative (NO), i.e. if the present loop is performed immediately after stoppage of the engine 3, the respective temperatures Ta, Tb, and Tc currently detected by the exhaust gas temperature sensors A, B, and C are set to initial temperatures Taini, Tbini, and Tcini during engine stoppage (in a step 3), followed by the process proceeding to a step 4.

On the other hand, if the answer to the question of the step 2 is affirmative (YES), i.e. if the present loop is a second or other subsequent loop after stoppage of the engine 3, the step 3 is skipped, followed by the process proceeding to the step 4. In the step 4, an estimated normal value N is calculated by searching an estimated normal value map according to the timer value TMENGSTP of a stoppage duration timer indicative of a time period elapsed after stoppage of the engine 3 (hereinafter referred to as "the stoppage time period").

The estimated normal value map is obtained by determining the values of dimensionless values a, b, and c, described hereinafter, which should be obtained when the exhaust gas temperature sensors A, B, and C are all normal, e.g. by experiments and setting the thus obtained resulting values in a single map (see FIG. 8). It should be noted that the above estimated normal value N may be calculated by a predetermined calculation formula using the initial temperatures Taini, Tbini, and Tcini detected by the exhaust gas temperature sensors A, B, and C, and the outside air temperature Tatm detected by the outside air temperature sensor 6 as parameters.

Then, in a step 5, the dimensionless values a, b, and c of the exhaust gas temperature sensors A, B, and C are calculated. More specifically, as expressed by the following equations (1) to (3), each of the dimensionless values a, b, and c is made dimensionless by dividing the difference between each of the temperatures Ta, Tb, and Tc currently detected by the exhaust gas temperature sensors A, B, and C and the outside air temperature Tatm, by the difference between each of the initial temperatures Taini, Tbini, and Tcini obtained in the step 3 and the outside air temperature Tatm.

$$a=(Ta-Tatm)/(Taini-Tatm) \quad (1)$$

$$b=(Tb-Tatm)/(Tbini-Tatm) \quad (2)$$

$$c=(Tc-Tatm)/(Tcini-Tatm) \quad (3)$$

It should be noted that the dimensionless values a, b, and c may be corrected as required, depending on locations where the exhaust gas temperature sensors A, B, and C are disposed.

Figure 3:
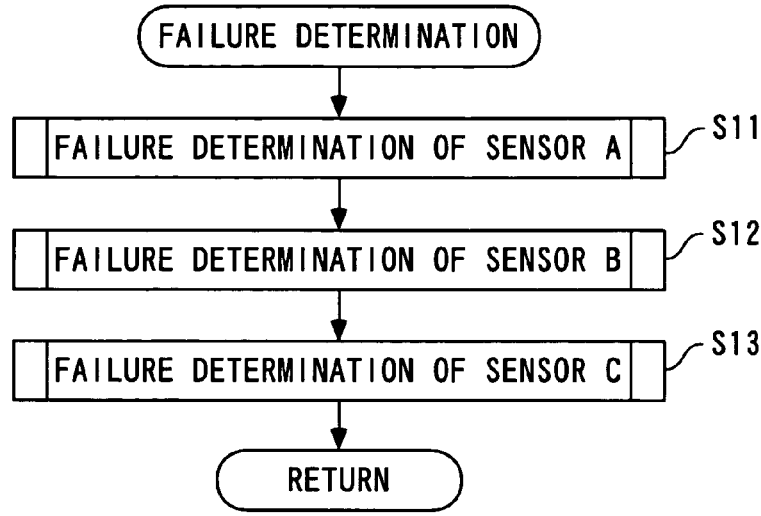
FIG. 3 is a flowchart showing a subroutine for carrying out the failure determination process appearing in the FIG. 2 flowchart.

Then, in a step 6, the failure determination process for determining failures of the exhaust gas temperature sensors A, B, and C is carried out. Referring to FIG. 3, in the failure determination process, it is determined on a sensor-by-sensor basis whether or not the exhaust gas temperature sensors A, B, and C are faulty (steps 11, 12, and 13). The processes are executed by subroutines shown in FIGS. 4 to 6, respectively.

Figure 4:
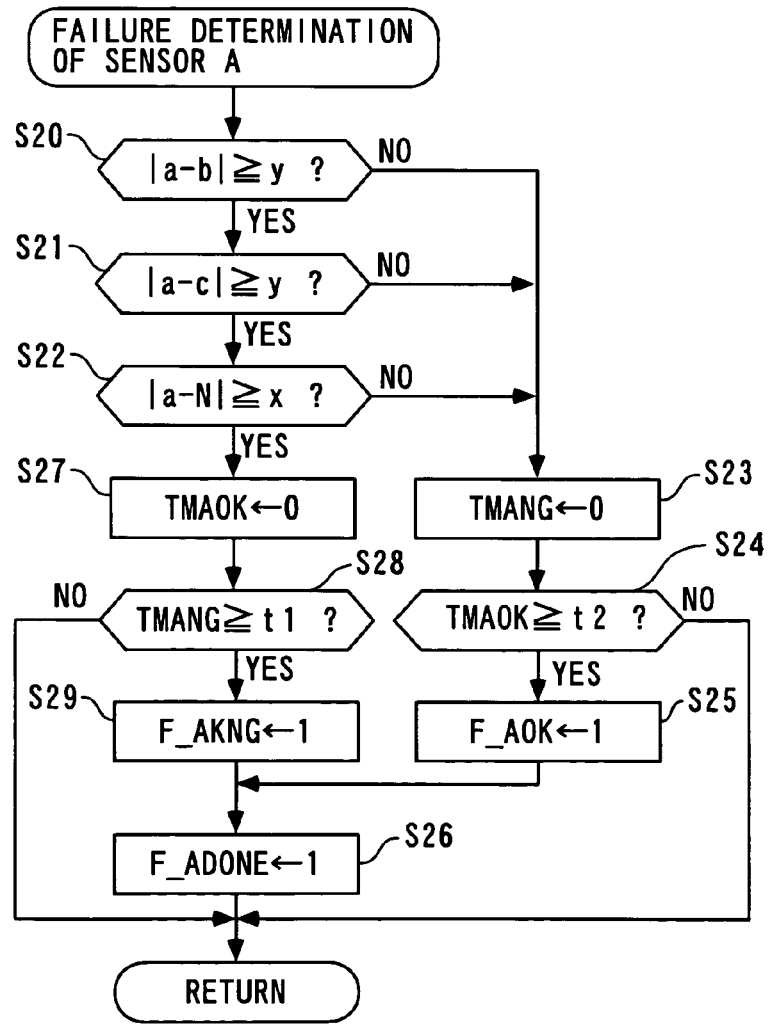
FIG. 4 is a flowchart showing a subroutine for carrying out a failure determination process for determining the failure of an exhaust gas temperature sensor A in the FIG. 3 flowchart.

FIG. 4 shows the failure determination process executed in the step 11 in FIG. 3 for determining failure of the exhaust gas temperature sensor A. As shown in FIG. 4, in the present process, first, it is determined whether or not the absolute value of the difference between the dimensionless value a and the dimensionless value b is not smaller than a predetermined threshold value y (e.g. 0.1; see FIG. 8) (step 20), whether or not the absolute value of the difference between the dimensionless value a and the dimensionless value c is not smaller than the predetermined threshold value y (step 21), and whether or not the absolute value of the difference between the dimensionless value a and the estimated normal value N is not smaller than a predetermined threshold value x (e.g. 0.15; see FIG. 8) (step 22).

If any of the answers to the questions of the steps 20, 21, and 22 is negative (NO), i.e. if the absolute value of the difference between the dimensionless value a and at least one of the dimensionless value b, the dimensionless value c, and the estimated normal value N is smaller than the associated predetermined threshold value y or x, the timer value TMANG of an upcount failure determination timer for the exhaust gas temperature sensor A is reset to 0 (step 23). Then, it is determined whether or not the timer value TMAOK of a normality determining timer for the exhaust gas temperature sensor A is not smaller than a predetermined time period t2 (e.g. 20 minutes) (step 24). As described hereinafter, this timer value TMAOK of the normality determining timer is reset to 0 when all the answers of the questions of the steps 20 to 22 are affirmative (YES). If the answer to the question of the step 24 is negative (NO), the present process is immediately terminated. On the other hand, if the answer to the question of the step 24 is affirmative (YES), i.e. if the state of any of the answers to the questions of the steps 20 to 22 being negative (NO) has continued for the predetermined time period t2, it is judged that the exhaust gas temperature sensor A is normal, and to indicate the fact, a sensor A normal flag F_AOK is set to 1 (step 25). Then, to indicate that failure determination of the exhaust gas temperature sensor A has been terminated, a sensor A determination termination flag F_ADONE is set to 1 (step 26), followed by terminating the present process.

On the other hand, if all the answers to the questions of the steps 20, 21, and 22 are affirmative (YES), i.e. if the absolute value of the difference between the dimensionless value a and each of the dimensionless value b, the dimensionless value c, and the estimated normal value N is larger than the associated predetermined threshold value y or x, it is judged that there is a high possibility of the failure of the exhaust gas temperature sensor A, and the timer value TMAOK of the normality determining timer is reset to 0 (step 27). Then, it is determined whether or not the timer value TMANG of the failure determination timer reset in the step 23 is not smaller than a predetermined time period t1 (e.g. five minutes) (step 28). If the answer to this question is negative (NO), the present process is immediately terminated. On the other hand, if the answer to the question of the step 28 is affirmative (YES), i.e. if the state of all the answers to the questions of the steps 20 to 22 being affirmative (YES) has continued for the predetermined time period t1, it is provisionally determined that the exhaust gas temperature sensor A is faulty, and a sensor A provisional failure flag F_AKNG is set to 1 to indicate the fact (step 29). Then, the above-described step 26 is executed, followed by terminating the present process.

Figure 5:
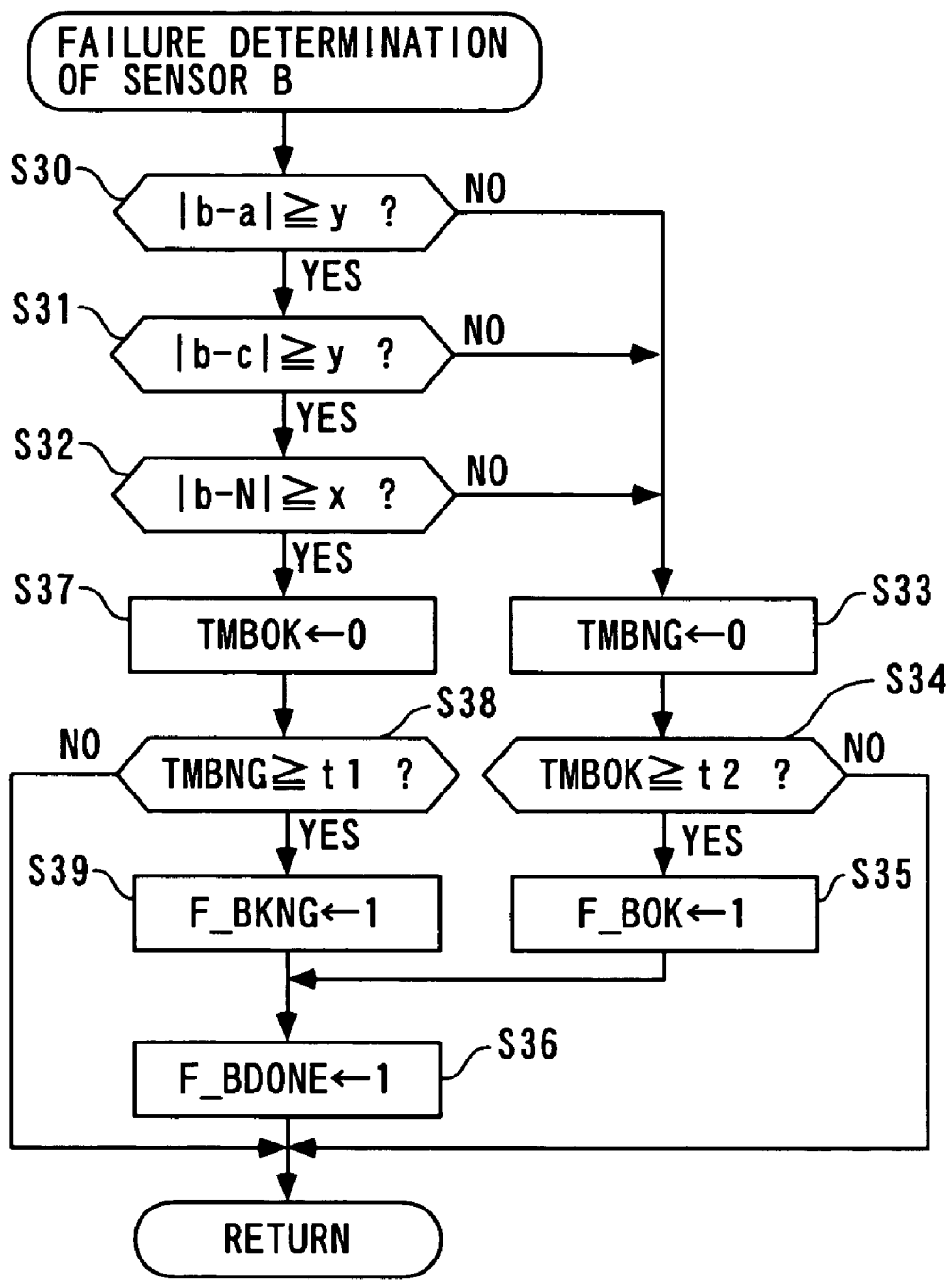
FIG. 5 is a flowchart showing a subroutine for carrying out a failure determination process for determining the failure of an exhaust gas temperature sensor B in the FIG. 3 flowchart.

Further, as shown in FIG. 5, in the failure determination process for determining a failure of the exhaust gas temperature sensor B, the failure of the exhaust gas temperature sensor B is determined exactly similarly to the failure determination process for determining the failure of the exhaust gas temperature sensor A. More specifically, in the present process, first, it is determined whether or not the absolute value of the difference between the dimensionless value b and each of the dimensionless values a and c is not smaller than the above-described predetermined threshold value y (steps 30 and 31), and whether or not the absolute value of the difference between the dimensionless value b and the estimated normal value N is not smaller than the above-described predetermined threshold value x (step 32). If any of the answers to the questions of the steps 30, 31, and 32 is negative (NO), the timer value TMBNG of a failure determination timer for the exhaust gas temperature sensor B is reset to 0 (step 33). Then, it is determined whether or not the timer value TMBOK of a normality determining timer for the exhaust gas temperature sensor B is not smaller than the predetermined time period t2 (step 34). If the answer to this question is negative (NO), the present process is immediately terminated, whereas if the answer to the question of the step 34 is affirmative (YES), it is judged that the exhaust gas temperature sensor B is normal, and to indicate the fact, a sensor B normal flag F_BOK is set to 1 (step 35). Then, a sensor B determination termination flag F_BDONE is set to 1 (step 36), followed by terminating the present process.

If all the answers to the questions of the steps 30, 31, and 32 are affirmative (YES), and the timer value TMBOK of the normality determining timer is reset to 0 (step 37). Then, it is determined whether or not the timer value TMBNG of the failure determination timer for the exhaust gas temperature sensor B is not smaller than the above-described predetermined time period t1 (step 38). If the answer to this question is negative (NO), the present process is immediately terminated. On the other hand, if the answer to the question of the step 38 is affirmative (YES), it is provisionally determined that the exhaust gas temperature sensor B is faulty, and a sensor B provisional failure flag F_BKNG is set to 1 to indicate the fact (step 39). Then, the above-described step 36 is executed, followed by terminating the present process.

Figure 6:
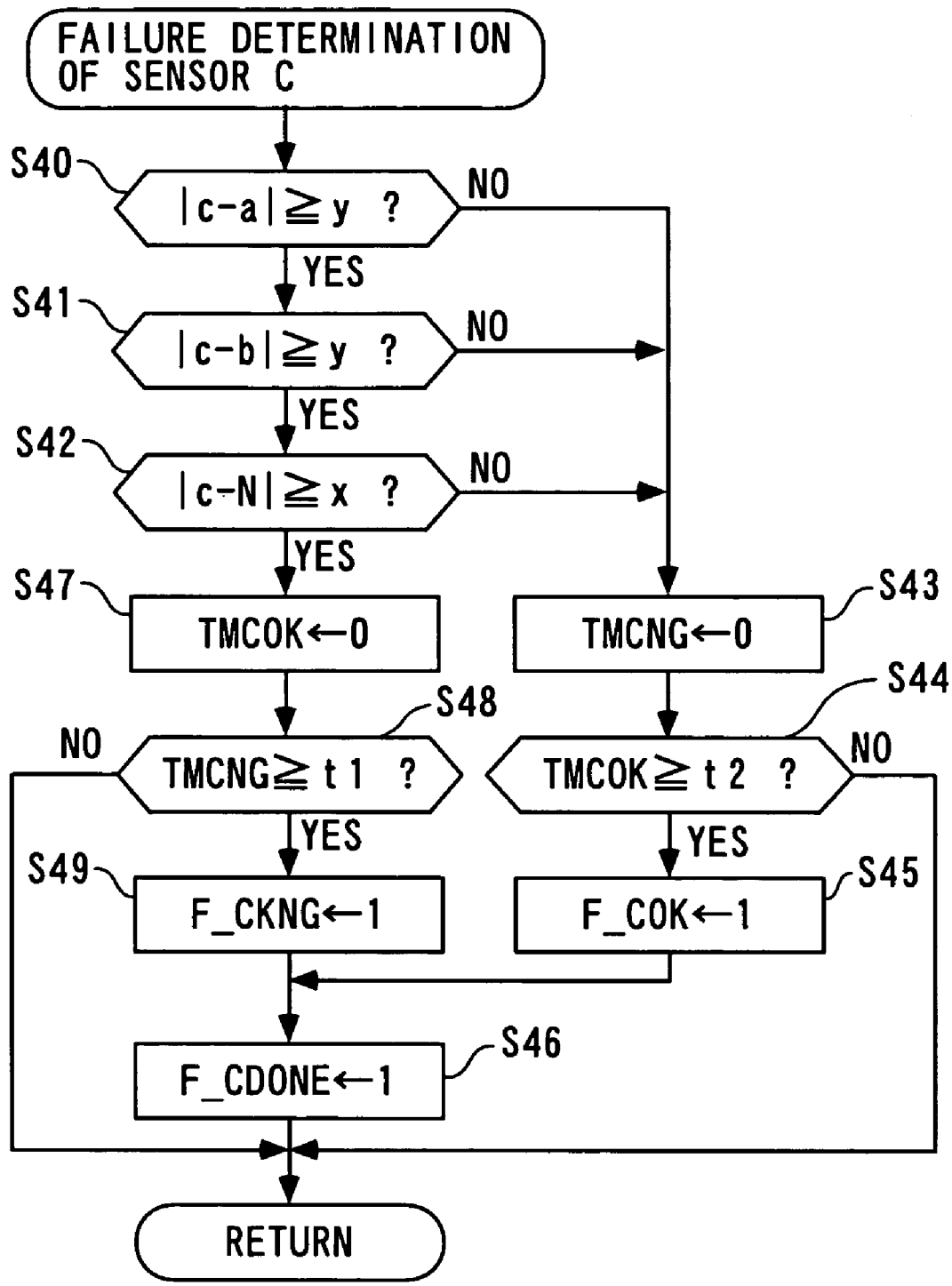
FIG. 6 is a flowchart showing a subroutine for carrying out a failure determination process for determining the failure of an exhaust gas temperature sensor C in the FIG. 3 flowchart.

Further, as shown in FIG. 6, also in the failure determination process for determining a failure of the exhaust gas temperature sensor C, the failure of the exhaust gas temperature sensor C is determined exactly similarly to the failure determination process for determining the failure of the exhaust gas temperature sensor A. In the present process, first, it is determined whether or not the absolute value of the difference between the dimensionless value c and each of the dimensionless values a and b is not smaller than the above-described predetermined threshold value y (steps 40 and 41), and it is determined whether or not the absolute value of the difference between the dimensionless value c and the estimated normal value N is not smaller than the above-described predetermined threshold value x (step 42). If any of the answers to the questions of the steps 40, 41, and 42 is negative (NO), the timer value TMCNG of a failure determination timer for the exhaust gas temperature sensor C is reset to 0 (step 43). Then, it is determined whether or not the timer value TMCOK of a normality determining timer for the exhaust gas temperature sensor C is not smaller than the predetermined time period t2 (step 44). If the answer to this question is negative (NO), the present process is immediately terminated, whereas if the answer to the question of the step 44 is affirmative (YES), it is judged that the exhaust gas temperature sensor C is normal, and to indicate the fact, a sensor C normal flag F_COK is set to 1 (step 45). Then, a sensor C determination termination flag F_CDONE is set to 1 (step 46), followed by terminating the present process.

If all the answers to the questions of the steps 40, 41, and 42 are affirmative (YES), the timer value TMCOK of the normality determining timer for the exhaust gas temperature sensor C is reset to 0 (step 47). Then, it is determined whether or not the timer value TMCNG of the failure determination timer for the exhaust gas temperature sensor C is not smaller than the predetermined time period t1 (step 48). If the answer to this question is negative (NO), the present process is immediately terminated. On the other hand, if the answer to the question of the step 48 is affirmative (YES), it is provisionally determined that the exhaust gas temperature sensor C is faulty, and a sensor C provisional failure flag F_CKNG is set to 1 to indicate the fact (step 49). Then, the step 46 is executed, followed by terminating the present process.

Figure 7:
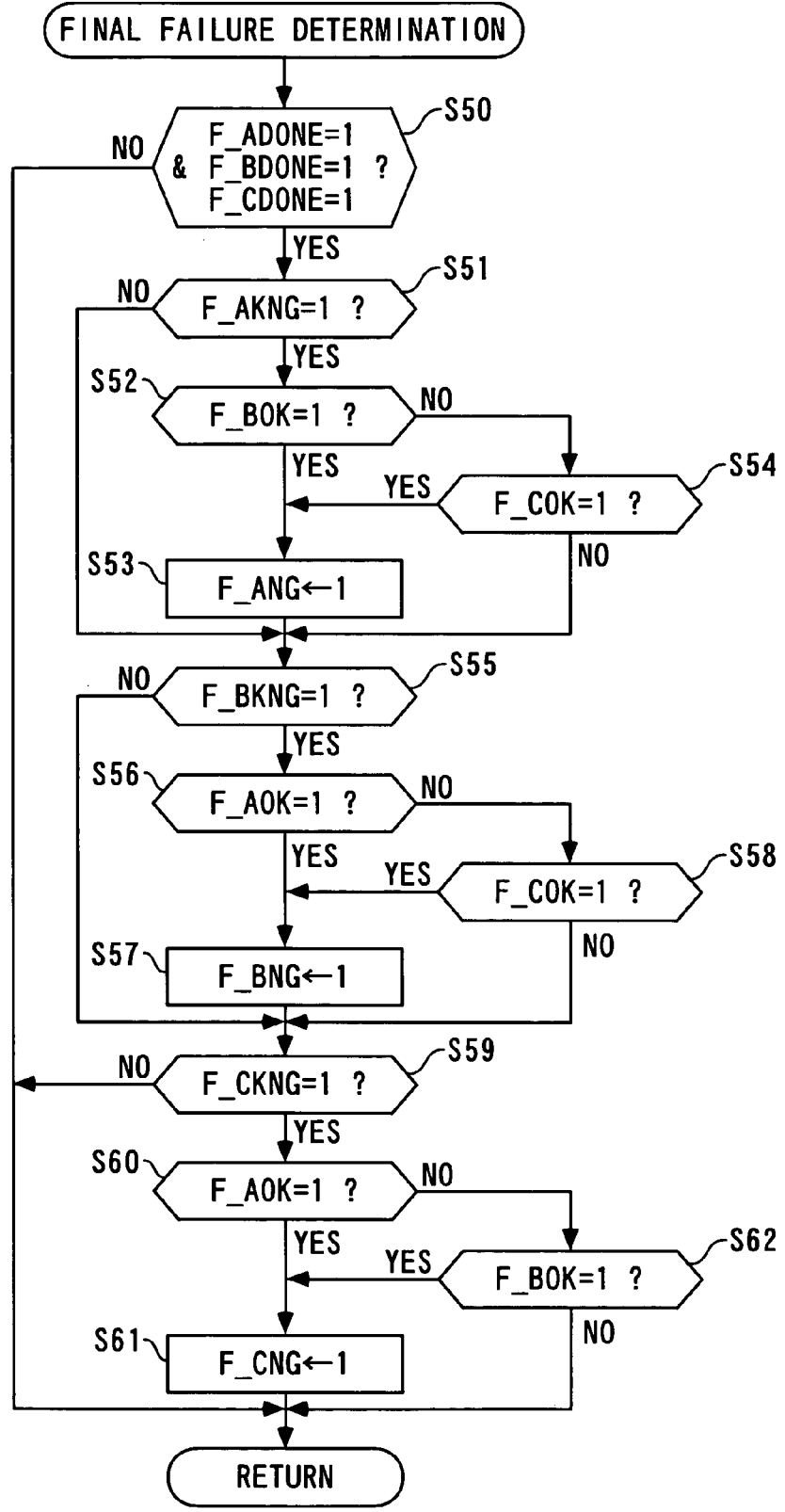
FIG. 7 is a flowchart showing a subroutine for carrying out a final determination process for finally determining failures of the three exhaust gas temperature sensors in the FIG. 2 flowchart.

Referring again to FIG. 2, in a step 7 following the step 6, a final determination process for finally determining failures of the exhaust gas temperature sensors A, B, and C is carried out, followed by terminating the present process. FIG. 7 shows the final determination process for finally determining failures of the exhaust gas temperature sensors A, B, and C. As shown in FIG. 7, in the present process, first, it is determined whether or not the sensor A determination termination flag F_ADONE, the sensor B determination termination flag F_BDONE, and the sensor C determination termination flag F_CDONE, which are set in the failure determination processes shown in FIGS. 4 to 6, respectively, are all equal to 1 (step 50). If the answer to this question is negative (NO), i.e. if the failure determination of at least one of the exhaust gas temperature sensors A, B, and C has not been terminated, the present process is immediately terminated.

On the other hand, if the answer to the question of the step 50 is affirmative (YES), the final determination process for finally determining the failure of the exhaust gas temperature sensor A is carried out in steps 51 to 54. First, it is determined whether or not the sensor A provisional failure flag F_AKNG is equal to 1 (step 51). If the answer to this question is negative (NO), i.e. if it has been determined that the exhaust gas temperature sensor A is normal, the steps 52 to 54, described hereinafter, are skipped, followed by the process proceeding to a step 55.

On the other hand, if the answer to the question of the step 51 is affirmative (YES), i.e. if it has been provisionally determined that the exhaust gas temperature sensor A is faulty, it is determined whether or not the sensor B normal flag F_BOK is equal to 1 (step 52). If the answer to this question is affirmative (YES), i.e. if it has been determined that the exhaust gas temperature sensor B is normal, it is finally determined that the exhaust gas temperature sensor A is faulty, since the conditions of the steps 20 and 28 in FIG. 4 are satisfied, that is, since the state of the dimensionless value a of the exhaust gas temperature sensor A largely deviating from the dimensionless value b of the normal exhaust gas temperature sensor B has continued for not shorter than the predetermined time period t1. Therefore, to indicate the fact, a sensor A failure flag F_ANG is set to 1 (step 53), followed by the process proceeding to the step 55.

On the other hand, if the answer to the question of the step 52 is negative (NO), i.e. if it has been provisionally determined that the exhaust gas temperature sensor B is faulty, it is determined whether or not the sensor C normal flag F_COK is equal to 1 (step 54). If the answer to this question is affirmative (YES), i.e. if it has been determined that the exhaust gas temperature sensor C is normal, it is finally determined that the exhaust gas temperature sensor A is faulty, for the same reason as in the aforementioned case where it is determined that the exhaust gas temperature sensor B is normal (YES to S52), and the step 53 is executed, followed by the process proceeding to the step 55. On the other hand, if the answer to the question of the step 54 is negative (NO), i.e. if it has been provisionally determined that the exhaust gas temperature sensor C is faulty, the process proceeds to the step 55.

In the steps 55 to 58, the final determination process for finally determining the failure of the exhaust gas temperature sensor B is carried out exactly similarly to the steps 51 to 54 in the case of the exhaust gas temperature sensor A. More specifically, it is determined in the step 55 whether or not the sensor B provisional failure flag F_BKNG is equal to 1. If the answer to this question is negative (NO), the steps 56 to 58, described hereinafter, are skipped, followed by the process proceeding to a step 59.

On the other hand, if the answer to the question of the step 55 is affirmative (YES), i.e. if it has been provisionally determined that the exhaust gas temperature sensor B is faulty, it is determined whether or not the sensor A normal flag F_AOK is equal to 1 (step 56). If the answer to this question is affirmative (YES), i.e. if it has been determined that the exhaust gas temperature sensor A is normal, it is finally determined that the exhaust gas temperature sensor B is faulty, and to indicate the fact, a sensor B failure flag F_BNG is set to 1 (step 57), followed by the process proceeding to the step 59. On the other hand, if the answer to the question of the step 56 is negative (NO), it is determined whether or not the sensor C normal flag F_COK is equal to 1 (step 58). If the answer to this question is affirmative (YES), i.e. if it has been determined that the exhaust gas temperature sensor C is normal, it is finally determined that the exhaust gas temperature sensor B is faulty, and the step 57 is executed, followed by the process proceeding to the step 59. On the other hand, if the answer to the question of the step 58 is negative (NO), i.e. if it has been provisionally determined that the exhaust gas temperature sensor C is faulty, the process proceeds to the step 59.

In the steps 59 to 62, the final determination process for finally determining the failure of the exhaust gas temperature sensor C is carried out exactly similarly to the steps 51 to 54 in the case of the exhaust gas temperature sensor A. More specifically, it is determined in the step 59 whether or not the sensor C provisional failure flag F_CKNG is equal to 1. If the answer to this question is negative (NO), the steps 60 to 62, described hereinafter, are skipped, followed by terminating the present process.

On the other hand, if the answer to the question of the step 59 is affirmative (YES), i.e. if it has been provisionally determined that the exhaust gas temperature sensor C is faulty, it is determined whether or not the sensor A normal flag F_AOK is equal to 1 (step 60). If the answer to this question is affirmative (YES), i.e. if it has been determined that the exhaust gas temperature sensor A is normal, it is finally determined that the exhaust gas temperature sensor C is faulty, and to indicate the fact, a sensor C failure flag F_CNG is set to 1 (step 61), followed by terminating the present process. On the other hand, if the answer to the question of the step 60 is negative (NO), it is determined whether or not the sensor B normal flag F_BOK is equal to 1 (step 62). If the answer to this question is affirmative (YES), i.e. if it has been determined that the exhaust gas temperature sensor B is normal, it is finally determined that the exhaust gas temperature sensor C is faulty, and the step 61 is executed, followed by terminating the present process. On the other hand, if the answer to the question of the step 62 is negative (NO), i.e. if it has been provisionally determined that the exhaust gas temperature sensor B is faulty, the present process is immediately terminated.

FIG. 8 shows examples of changes in the respective dimensionless values a, b, and c of the three exhaust gas temperature sensors A, B, and C, obtained by the above-described failure determination processes according to the present embodiment, and the estimated normal value N. As shown in FIG. 8, in the illustrate example, the estimated normal value N is set such that it decreases gently for a relatively short time period after stoppage of the engine 3, and after decreasing steeply, it decrease gently again. Further, it is assumed that the exhaust gas temperature sensor A is faulty and hence a detection value detected thereby changes such that it decreases very gently, and the exhaust gas temperature sensors B and C are normal.

As shown in FIG. 8, since the exhaust gas temperature sensors B and C are normal, the dimensionless values b and c obtained therefrom change along the estimated normal value N after stoppage of the engine 3, and the absolute values (|b−N| and |c−N|) of the difference between the dimensionless value b and the estimated normal value N and the difference between the dimensionless value c and the estimated normal value N remain smaller than the threshold value x until the predetermined time period t2 elapses. Therefore, the exhaust gas temperature sensors B and C are determined to be normal when the predetermined time period t2 has elapsed after stoppage of the engine 3, that is, at time tγ (see the steps 34 and 35 in FIG. 5, and the steps 44 and 45 in FIG. 6). In contrast, the exhaust gas temperature sensor A is faulty, as mentioned above, and the dimensionless value a obtained therefrom decreases very gently after the stoppage of the engine 3, so that the absolute values (|a−b| and |a−c|) of the difference between the dimensionless values a and b and the difference between the dimensionless values a and c have already become larger than the threshold value y at time tα, and further the absolute value (|a−N|) of the difference between the dimensionless value a and the estimated normal value N becomes larger than the threshold value x. At time tβ, at which the above state has continued for the predetermined time period t1 after the time tα, it is provisionally determined that the exhaust gas temperature sensor A is faulty (see the steps 20 to 22, and the steps 28 and 29 in FIG. 4). After that, as described hereinabove, at the time tγ, when the exhaust gas temperature sensors B and C are determined to be normal, the failure of the exhaust gas temperature sensor A is finally determined (see the steps 51 to 53 in FIG. 7).

As described hereinbefore, according to the present embodiment, the failures of the exhaust gas temperature sensors A, B, and C are determined by comparing the dimensionless values a, b, and c, which are obtained by making dimensionless the temperatures Ta, Tb, and Tc detected by the exhaust gas temperature sensors A, B, and C after stoppage of the engine 3, based on the respective initial temperatures Taini, Tbini, and Tcini, with the estimated normal value N, and comparing the dimensionless values a, b, and c themselves with each other. Therefore, differently from the conventional failure determination system, which carries out failure determination by comparing final convergence values of a plurality of temperature sensors with each other, it is possible to accurately determine failures of the exhaust gas temperature sensors A, B, and C in actual operating temperature ranges thereof. Further, to determine the failures of the exhaust gas temperature sensors A, B, and C, it is only required to prepare one estimated normal value map indicative of changes in the dimensionless values a, b, and c which are to be obtained when the exhaust gas temperature sensors A, B, and C are normal, and therefore even when the actual operating temperature ranges of the exhaust gas temperature sensors A, B, and C are different from each other, it is possible to easily determine failures of the exhaust gas temperature sensors A, B, and C according to a single criterion.

It should be noted that the present invention is not limited to the embodiment described above, but can be practiced in various forms. For example, although in the above-described embodiment, to determine failures of the exhaust gas temperature sensors A, B, and C, the comparison of each of the dimensionless values a, b, and c obtained from the exhaust gas temperature sensors A, B, and C, with the estimated normal value N, and the comparison between the dimensionless values a, b, and c are both performed, this is not limitative, but failures of the exhaust gas temperature sensors A, B, and C may be determined by performing only one of the two types of comparisons. Further, although in the above-described embodiment, failure determination is carried out on the three exhaust gas temperature sensors A, B, and C arranged in the exhaust emission control device 8, by way of example, this is not limitative, but the present invention can also be applied to failure determination of other temperature sensors provided in the engine 3, such as an engine coolant temperature sensor and an intake air temperature sensor. Furthermore, the number of temperature sensors subjected to the failure determination is not limited to three as in the above-described embodiment, but it may be set to any desired number so long as it is a plural number. Further, the details of the construction of the failure determination system are described only by way of example, and they can be varied as required so long as the same do not depart from the scope of the invention.

It is further understood by those skilled in the art that the foregoing are preferred embodiments of the invention, and that various changes and modifications may be made without departing from the spirit and scope thereof.

What is claimed is:

1. A failure determination system for determining failures of a plurality of temperature sensors provided in an internal combustion engine, comprising:
    stoppage detecting means for detecting whether or not the engine has stopped;
    initial temperature-storing means for storing respective temperatures detected by the temperature sensors when stoppage of the engine is detected, as initial temperatures;
    dimensionless value-calculating means for making dimensionless the respective temperatures detected by the temperature sensors after stoppage of the engine based on the corresponding initial temperatures, to thereby calculate respective dimensionless values of the temperatures detected by the temperature sensors; and
    failure determination means for determining failures of the temperature sensors based on results of comparisons between the calculated dimensionless values of the temperatures detected by the temperature sensors.

2. A failure determination system for determining failures of a plurality of temperature sensors provided in an internal combustion engine, comprising:
    stoppage detecting means for detecting whether or not the engine has stopped;
    initial temperature-storing means for storing respective temperatures detected by the temperature sensors when stoppage of the engine is detected, as initial temperatures;
    dimensionless value-calculating means for making dimensionless the respective temperatures detected by the temperature sensors after stoppage of the engine based on the corresponding initial temperatures, to thereby calculate respective dimensionless values of the temperatures detected by the temperature sensors;
    estimated normal value-setting means for setting in advance an estimated value of a dimensionless value of a temperature to be detected when each of the temperature sensors is normal, as an estimated normal value; and
    failure determination means for determining failures of the temperature sensors based on results of comparisons of the respective calculated dimensionless values of the temperatures detected by the temperature sensors with the set estimated normal value.

3. A method of determining failures of a plurality of temperature sensors provided in an internal combustion engine, comprising:
    a stoppage detecting step of detecting whether or not the engine has stopped;
    an initial temperature-storing step of storing respective temperatures detected by the temperature sensors when stoppage of the engine is detected, as initial temperatures;
    a dimensionless value-calculating step of making dimensionless the respective temperatures detected by the temperature sensors after stoppage of the engine based on the corresponding initial temperatures, to thereby calculate respective dimensionless values of the temperatures detected by the temperature sensors; and
    a failure determination step of determining failures of the temperature sensors based on results of comparisons between the calculated dimensionless values of the temperatures detected by the temperature sensors.

4. A method of determining failures of a plurality of temperature sensors provided in an internal combustion engine, comprising:
    a stoppage detecting step of detecting whether or not the engine has stopped;
    an initial temperature-storing step of storing respective temperatures detected by the temperature sensors when stoppage of the engine is detected, as initial temperatures;
    a dimensionless value-calculating step of making dimensionless the respective temperatures detected by the temperature sensors after stoppage of the engine based on the corresponding initial temperatures, to thereby calculate respective dimensionless values of the temperatures detected by the temperature sensors;
    an estimated normal value-setting step of setting in advance an estimated value of a dimensionless value of a temperature to be detected when the temperature sensors are normal, as an estimated normal value; and
    a failure determination step of determining failures of the temperature sensors based on results of comparisons of the respective calculated dimensionless values of the temperatures detected by the temperature sensors with the set estimated normal value.

5. An engine control unit including a control program for causing a computer to determine failures of a plurality of temperature sensors provided in an internal combustion engine,
    wherein the control program causes the computer to detect whether or not the engine has stopped, store respective temperatures detected by the temperature sensors when stoppage of the engine is detected, as initial temperatures, make dimensionless the respective temperatures detected by the temperature sensors after stoppage of the engine based on the corresponding initial temperatures, to thereby calculate respective dimensionless values of the temperatures detected by the temperature sensors, and determine failures of the temperature sensors based on results of comparisons between the calculated dimensionless values of the temperatures detected by the temperature sensors.

6. An engine control unit including a control program for causing a computer to determine failures of a plurality of temperature sensors provided in an internal combustion engine,
    wherein the control program causes the computer to detect whether or not the engine has stopped, store respective temperatures detected by the temperature sensors when stoppage of the engine is detected, as initial temperatures, make dimensionless the respective temperatures detected by the temperature sensors after stoppage of the engine based on the corresponding initial temperatures, to thereby calculate respective dimensionless values of the temperatures detected by the temperature sensors, set in advance an estimated value of a dimensionless value of a temperature to be detected when the temperature sensors are normal, as an estimated normal value, and determine failures of the temperature sensors based on results of comparisons of the respective calculated dimensionless values of the temperatures detected by the temperature sensors with the set estimated normal value.

* * * * *